Feb. 4, 1958    R. L. JAESCHKE    2,822,070
MAGNETIC CLUTCH
Filed April 5, 1954
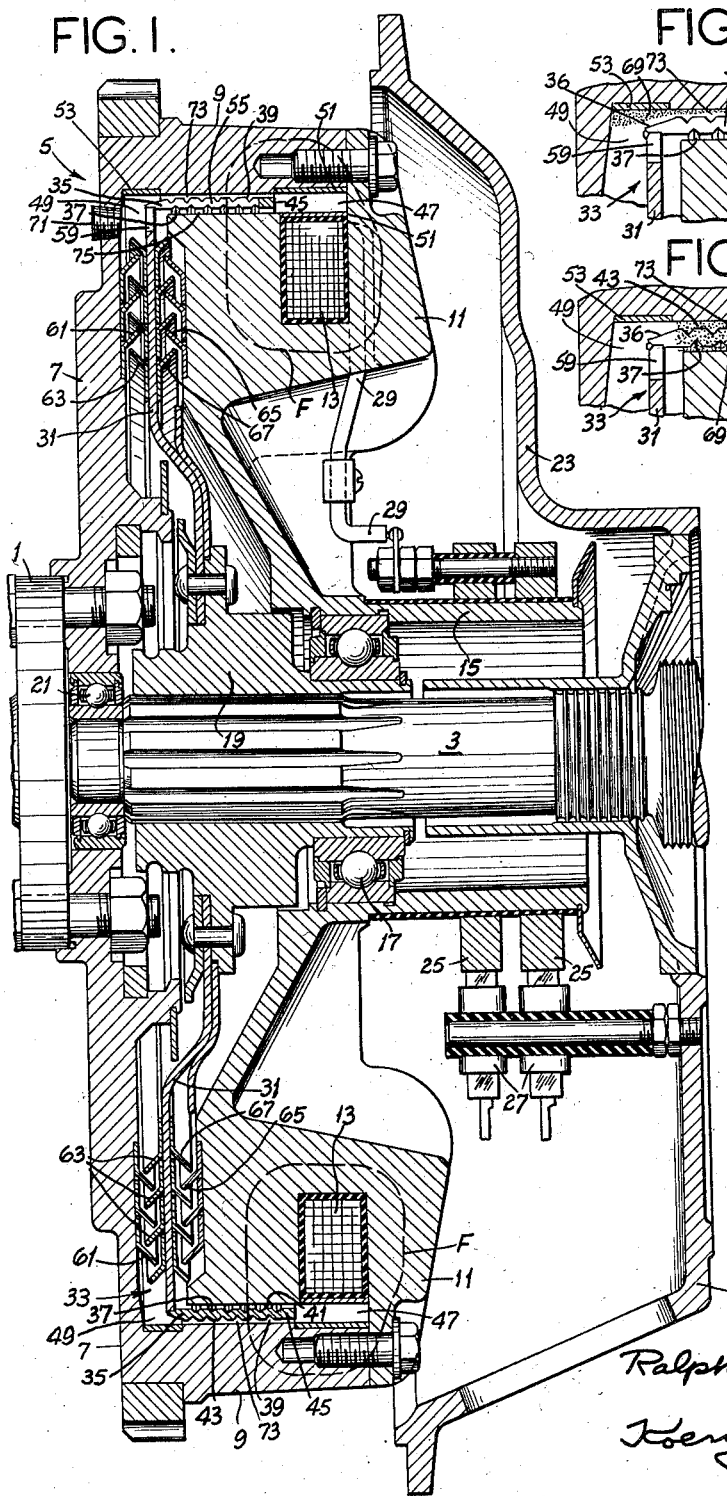
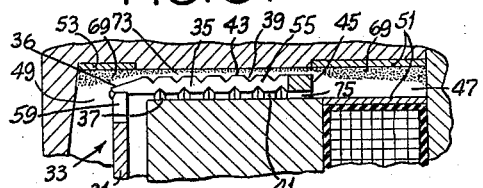
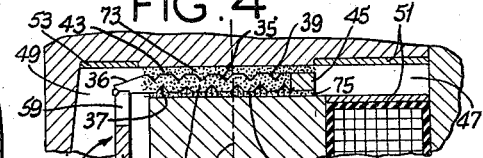
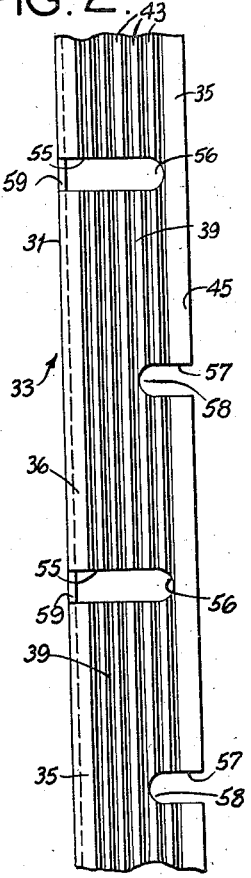
Ralph L. Jaeschke,
Inventor.
Koenig and Pope,
Attorneys.

2,822,070

MAGNETIC CLUTCH

Ralph L. Jaeschke, Kenosha, Wis., assignor to Eaton Manufacturing Company, Cleveland, Ohio, a corporation of Ohio Application April 5, 1954, Serial No. 420,970

3 Claims. (Cl. 192—21.5)

This invention relates to magnetic clutches of the type in which a flowable magnetic material of magnetically variable shear strength is employed for closing several magnetic gaps between magnetic members when a magnetic field is energized, the magnetic material being movable from the gaps substantially to clear them when the magnetic field is deenergized.

The invention is an improvement upon the construction disclosed in the copending, coassigned United States patent application of Anthony Winther, Serial No. 262,779, filed December 21, 1951, for Magnetic Clutch, issued as Patent 2,745,527, dated May 15, 1956.

Among the several objects of the invention may be noted the provision of a magnetic clutch of the class described, having a substantial weight decrease for a given torque without sacrifice of rigidity in important drive elements; the provision of a magnetic clutch of the class described in which temperatures within the flowable material are decreased while at the same time providing for increase in the torque delivered; and the arrangement in a clutch of the class described for rapid movement of the flowable magnetic material into and out of the gap under excited and deexcited conditions, respectively, and substantial circulation in the gap under semiexcited conditions. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is an axial section of an automotive clutch embodying the invention;

Fig. 2 is a developed view of the outside face of the driven member of the clutch;

Fig. 3 is an enlarged axial detail section showing released conditions of certain magnetic materials; and Fig. 4 is a view similar to Fig. 3, showing said magnetic material in driving position.

Corresponding reference characters indicate corresponding parts throughout the several views of the drawings.

Referring now more particularly to Fig. 1, there is shown at numeral 1 a driver such as, for example, the flange of an internal combustion engine. At numeral 3 is shown a driven shaft. Bolted to the driver 1 is the driving member 5 of the clutch. The member 5 is constituted by a radial portion 7, an outer peripheral ferromagnetic ring 9 (parts 7 and 9 having a cup shape) and an inner ferromagnetic ring 11. Ring 11 is bolted to the end of ring 9 and is formed with a recess containing an annularly wound electromagnetic field coil 13.

Centrally, the ring 11 is supported upon a sleeve 15 containing a bearing 17 for aligning a rotary hub 19. The hub 19 is splined to the driven shaft 3, which in turn is held in alignment with respect to the portion 7 by means of a pilot bearing 21. Other bearings for the shaft are not shown, being outside of the housing for the clutch. Part of this housing is indicated at 23. The remainder of the housing (not shown) extends from the engine of which flange 1 forms a part.

On the sleeve 15 are carried insulated collector rings 25 which are located in a suitable electrical control circuit of which brushes 27 form a part. The circuit is completed from the rings 25 through coil 13 by means of wiring indicated at 29.

Affixed to the hub 19 is a plate portion 31 of a cup-shaped drum, which is indicated in general by the numeral 33. The cup shape of the drum is completed by a ferromagnetic sleeve 35, the inner and outer faces of which are peripherally grooved, as indicated at 37 and 39, respectively. Although these grooves are indicated in the drawings as being circular, it will be understood that they may be spiral, and the term peripheral is intended to define both. Thus the inner and outer faces of the sleeve 35 are constituted by coextensive cylindric lands 41 and 43, which are formed by the grooves 37 and 39, respectively. The inner face of the ring 9 is cylindric and is spaced from the outer faces of lands of the sleeve 35 by a small magnetic gap 73 on the order of, for example, .020 inch. The outer face of the ring 11 is spaced from the inner faces of lands of sleeve 35 by a small magnetic gap 75 on the same order of dimension. The dimensions given are the distances from the tops of the stated lands.

Upon excitation of the annular coil, a toroidal flux field is generated such as indicated diagrammatically by the mean line F. This passes across the inner cylindric face of the outer ferromagnetic ring 9, through the sleeve 35 and across the outer cylindric face of the inner ring 11. This establishes a magnetic field in the two gaps 73 and 75, located inside and outside of the ring 35. By means of suitable control of the circuit connected to brushes 27, this magnetic field is made variable in intensity.

The edge or rim 45 of the sleeve 35 is adjacent one side of the coil 13, thus leaving a space or reservoir indicated at 47. A space or reservoir 49 exists also between the opposite end of the cup 33 and members 7 and 9. The ferromagnetic ring 9 is annularly lined with thin brass rings 51 and 53 outside of the spaces 47 and 49, respectively. These are nonmagnetic.

The sleeve 35 is provided with openings in the form of perforating axial slots 55 and perforating axial edge notches 57. These may be angled, that is spiral, if desired. The slots 55 extend through the plate 31, as indicated at 59. The drum 33 is formed by peripherally welding the sleeve 35 to the part 31. At this point the sleeve 35 is chamfered, as indicated at 36. These parts may be made integral, but in any event, it is preferable to maintain the chamfer 36.

Labyrinth seals are provided between opposite faces of the plate 31 and opposite faces of members 7 and 11. One of these (between members 7 and 31) is formed by a series of cones 61 attached to member 7 and interdigitating with a conversely sloped series of cones 63 attached to member 31. The other labyrinth seal (between members 11 and 31) is formed by a series of cones 65, attached to member 11 and interdigitating with a second conversely sloped series of cones 67 attached to the member 31.

The members 7, 9 and 11, taken in connection with the labyrinth seals, establish a cup-shaped space wherein is located a cup including the slotted sleeve 35. This construction establishes magnetic gaps 73 and 75 and also the spaces 47 and 49. Into the cup-shaped space thus provided is inserted a ferromagnetic normally flowable filling constituted preferably by a mixture 69. This mixture may be composed of ferromagnetic particles such as finely divided iron, iron alloy with a suitable additive such as finely divided graphite, aluminum oxide or the like. Or the additive may be constituted by a lubricant such as oil. Further details of this flowable ferromagnetic mixture are not necessary herein, since various mixtures of this type are known to those skilled in this art. Those having dry additives are known as dry mixtures; those having liquid additives as wet mixtures. Filling may be accomplished through an opening normally plugged, as indicated at 71.

A property of a ferromagnetic mixture of the type above described is that it will be attracted into a magnetic field, a mean line of which is indicated at F. Thus the material will seek a position across the magnetic gaps 73 and 75 when the coil 13 is electrically excited (Fig. 4). Field excitation also increases the shear stress between the magnetic particles, thus causing the clutch to transmit torque from 1 to 3. Upon deexciting the coil, the field F disappears, and the mixture against becomes demagnetized and loose. The particles are then free to seek any position required by centrifugal force, as illustrated in Fig. 3, wherein the material has migrated into the reservoirs 47 and 49, only a small amount, if any, remaining against the inner face of the ring 9. Under these conditions the clutch becomes released, i. e., no torque is transmitted. By varying the flow of current through coil 13, the magnetic field intensity is varied and the torque transmitted is varied with attendant variation in shear slip in the gaps 73 and 75. Under maximum excitation of coil 13, torque is delivered under conditions of synchronism between the driving and driven members with no shear slip in gaps 73 and 75. It will be understood that, although the member 33 is shown as the driven member, and members 7, 9 and 11 as drivers, this relationship under some circumstances may be reversed.

It may be mentioned that the grooves 37 and 39 are placed in the sleeve 35 so that heating due to slip takes place primarily adjacent the surfaces of the rings 9 and 11, from which it may be readily conducted away. The reason for this is that the flux intensity is highest at the faces of the lands 41 and 43, thus minimizing the shear slip at these faces. Such shear slip then occurs primarily where the flux density is lower, i. e., at the cylindric surfaces of members 9 and 11.

One of the features of the invention is the provision of the reservoirs 47 and 49, which are sufficient to receive all or substantially all of the flowable magnetic material when the clutch is deexcited, the material being stored on the nonmagnetic rings 51 and 53. These reservoirs also allow the fill of the clutch to be increased beyond that which is usual in clutches of this type. The result is increased torque capacity, and lower operating temperatures in the magnetic mixture constituting the fill.

Another feature relates to the slots 55 and notches 57. These to be effective must be of proper widths; i. e., the widths should be no less than twice, and preferably three or four times, the thickness between lands of the sleeve 35. Moreover, the slots 55 preferably should not extend to the edge 45; the notches 57 providing breaks through the edge 45 in portions nonadjacent to the ends of the slots 55. Peripherally, the ends 56 of slots 55 and the ends 58 of the notches 57 stagger or overlap. The reasons for the matters above stated relative to the slots 55 and notches 57 are as follows:

Free distribution and circulation of the flowable magnetic material are provided between the outside and inside of sleeve 35. If the slots 55 and notches 57 are made too narrow, a so-called magnetic fringe effect becomes dominant, which instead of encouraging distribution of the flowable material through the notches, prevents it. That is to say, in the case of too narrow an opening the field tends to by-pass the opening, instead of passing through it; whereas, if the opening is larger, the fringe effect is not dominant and a substantial part of the field will pass through the opening and carry with it the finely divided material. Thus the required ratio of 2:1 or more of the peripheral widths of the slots 55 and notches 57 to the thickness of the sleeve 35 is important.

It is also important that, considered in peripheral projection, there shall be open space somewhere axially across the entire sleeve 35, so that any magnetic material drawn through the slots 55 and notches 51 will (during slip movements upon acceleration) be spread over the entire axial lengths of and all around the members 9 and 11 adjacent sleeve 35. The staggering of the slots 55 and notches 57 (as compared to carrying the slots 55 directly to the edge 45) brings about a sleeve structure which is stronger against hoop stresses under centrifugal force.

On the other hand, it is not desirable unduly to increase the widths or number of the slots 55 and notches 57, since this robs the sleeve 35 of magnetic material and tends to reduce torque delivered. Thus a practical maximum of slot and notch widths to sleeve thickness between lands is on the order of 4:1. An appropriate number of slots 55 and notches 57 for the clutch shown is eight, respectively, making sixteen openings in all.

While the slots 55 and notches 57 are shown in the drawings in axial positions, it will be understood that they may be angled somewhat relative to the axis of rotation, and the term axial is intended to define both positions.

Operation is as follows:

Assume that driving member 5 is rotating, and that the driven member 33 is stationary and that the coil 13 is deexcited. This results in the flowable magnetic material 69 moving to the position approximately as shown in Fig. 3. Substantially all of the material will escape from the magnetic gaps into the storage spaces 47 and 49. A slight amount is diagrammatically shown in the outer magnetic gap 73, constituting a very thin film such as occurs under practical conditions. Thus no torque is transmitted by the clutch and there is no drag due to the magnetic material, except such as arises from windage and bearing friction, which are small.

Upon exciting coil 13, the toroidal flux field F is established, of a strength depending upon the ampere turns of excitation in the coil. The magnetic material 69 is attracted from the nonmagnetic rings 51 and 53 to gaps 73 and 75. Most of it first enters the outer gap 73. It then is drawn through the slots 55 and notches 57 and during slip is spread by a sort of sprinkling action over the entire outer face of the inner member 11. Thus both the outer and inner magnetic gaps are rapidly filled (Fig. 4). During the period of acceleration, or when the field intensity is not brought to maximum, slip will occur with a circulating condition set up in the magnetic material between the inner and outer magnetic gap through the slots and notches. This promotes rapid heat transfer from the material to the surrounding metal surfaces. This prevents the formation of damaging hot spots in the material.

Finally, upon maximum excitation of the coil 13, the magnetic field is strongly enough established to prevent all slip, whereupon torque is delivered under synchronization of the driving and driven members. Under such conditions there exists a strong interlocking action by reason of the columns of material connecting 9 and 11 through the slots and notches (Fig. 4).

Upon deexcitation, inverse action occurs, the then looser magnetic material flowing under centrifugal force through the slots 55 and notches 57 to the outer gap and finally migrating into the storage spaces 47 and 49. The purpose of the nonmagnetic rings 51 and 53 is to prevent stray parts of the field F from tending to hold the material in the storage spaces against the attractive force tending to draw it into the gaps, slots and notches upon excitation.

Advantages of the invention are as follows:

The storage spaces 47 and 49 are sufficiently large to receive and store all of the flowable magnetic material, thus making it possible completely to empty the gaps 73, 75, slots 55 and notches 57, resulting in the ability quickly to release the clutch upon deexciting the coil 13. It will be noted in this respect that the sum of the axial storage lengths on both sides of the drum is approximately equal to the effective drum length, i. e., its length adjacent the outer face of member 11 within the drum. This allows the clutch to be operated with a larger fill (substantially double the amount of former clutches) of flowable material than was the case in former clutches of this general type.

One of the advantages of the larger fill is that greater torque may be transmitted, since torque transmission is a function of the amount of fill. Moreover, the clutch for this reason also operates with the flowable material at a much lower temperature than heretofore, since for a given number of B. t. u. generated in the material under slipping conditions there is approximately double the amount of material, which will reach a lower temperature. Thus in a clutch made according to the invention, with storage areas filled with 35 ounces of material, the temperature in the material reaches approximately only 600° F., whereas with an 18-ounce fill, which would be had without the storage areas, the temperature would reach approximately 1,000° F. This lower temperature condition is desirable, since the life of the powder of which the flowable material is formed is more or less dependent upon its operating temperature. It should be understood in considering temperatures of the flowable material that the temperatures of the coil 13 do not reach such values, because of conduction and radiation that occur through members 9, 33 and 11 before such temperatures reach the coil 13. Heat transfer is also increased by reason of the existence of the storage areas, so that cooling by heat dissipation is improved in that respect.

Another advantage of the wide storage reservoirs 47 and 49 is that there will not be a high radial depth of material in the spaces when the clutch is released. Thus when the material finds its angle of repose under the 15 or 20 gravity units of centrifugal force, it will not tend to work back into the gaps 73 and 75 under deexcited conditions of coil 13.

Another advantage of the invention is that the relatively wide slots 55 and notches 57 permit of fast, even distribution of the flowable magnetic material into the magnetic gaps 73 and 75 when the coil 13 is excited. The material flows easily through the slots and notches. However, once the inner gap 75 has been filled, the slots and notches become closed with powder, thus preventing further loading of the inner gap. Conversely, when the coil is deenergized, the stiffened powder rapidly collapses and centrifugal force causes it to return through the openings to the outer gap and then to the storage spaces. Some, of course, reaches the storage spaces directly from the inner gap.

Another advantage of the invention is that with the wide slots 55, notches 57 and wide storage spaces 47 and 49, taken in connection with opening 59 in the plate 31, there is continual turbulence in the magnetic material under accelerating conditions as the coil 13 is excited. At full excitation under synchronous driving conditions, the magnetic material is of course essentially locked in place by the magnetic field.

The main slots 55 do not go to the edge 45 of the sleeve, but are supplemented by the additional staggered notches 57, so that the resulting total openings are equivalent to slots that would reach to the edge 45; but without the disadvantages of the formation of cantilever portions between the slots, which would otherwise reduce hoop strength. Thus the above advantages are obtained without sacrificing rigidity of the sleeve 35 under centrifugal force.

It will be understood that the principles disclosed herein are applicable when either of members 1 or 3 is held stationary, the other rotating, so as to function as a brake. The term clutch as used herein is therefore intended to be understood as comprehending brakes.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A magnetic clutch comprising driving and driven members one of which is constituted by spaced magnetizable members forming a cylindric compartment, flowable magnetizable material in said compartment, said compartment being closed at one end, the other member being formed as a cup having a radial portion and a magnetizable sleeve extending therefrom into the cylindric compartment with its rim within the compartment, said sleeve forming inner and outer magnetic gaps in said compartment, an annular field coil adapted to establish a toroidal flux field passing through said sleeve and magnetic gaps, said sleeve containing a plurality of staggered axially elongate slots whose axial dimensions are greater than their transverse peripheral dimensions and which overlap in the peripheral direction, the ratios of the transverse widths of said slots with respect to the sleeve thickness being in the range of approximately two to four times the radial sleeve thickness, said slots being peripherally spaced from one another at distances substantially greater than their widths.

2. A magnetic clutch comprising driving and driven members one of which is constituted by spaced magnetizable members forming a cylindric compartment, flowable magnetizable material in said compartment, said compartment being closed at one end, the other member being formed as a cup having a radial supporting portion and a magnetizable sleeve extending therefrom into the cylindric compartment with its rim within the compartment, said sleeve forming inner and outer magnetic gaps in said compartment, said cylindric compartment extending axially beyond both ends of the two gaps to form substantial storage space for said flowable material, the total axial extent of said storage space being substantially equal to the length of the portion of the sleeve between said gaps, an annular field coil adapted to establish a toroidal flux field passing through said sleeve and magnetic gaps, said sleeve containing a plurality of staggered axially elongate slots whose axial dimensions are greater than their transverse peripheral dimensions and which overlap in the peripheral direction, the ratios of the transverse widths of said slots with respect to the sleeve thickness being in the range of approximately two to four times the radial sleeve thickness, said slots being peripherally spaced from one another at distances substantially greater than their widths.

3. A magnetic clutch comprising driving and driven members one of which is constituted by spaced magnetizable members forming a cylindric compartment, flowable magnetizable material in said compartment, said compartment being closed at one end, the other member being formed as a cup having a radial portion and a magnetizable sleeve extending therefrom into the cylindric compartment with its rim within the compartment, said sleeve forming inner and outer magnetic gaps in said compartment, said cylindric compartment extending axially beyond both ends of the two gaps to form storage space for said flowable material, the total axial extent of said storage space being substantially equal to the length of the portion of the sleeve which is located between said gaps, a nonmagnetic liner outside of a portion of the storage space adjacent the radial portion of the cup, and inner and outer nonmagnetic liners located in the remaining portion of the storage space adjacent said rim, an annular field coil positioned on one of said members within said inner liner adapted to establish a toroidal flux field passing through said sleeve and magnetic gaps, said sleeve containing a plurality of staggered axially elongate slots whose axial dimensions are greater than their transverse peripheral dimensions and which overlap in the peripheral direction, the ratios of the transverse widths of said slots with respect to the sleeve thickness being in the range of approximately two to four times the radial sleeve thickness; said slots being peripherally spaced from one another at distances substantially greater than their widths.

References Cited in the file of this patent

UNITED STATES PATENTS

| | | |
|---|---|---|
| 2,543,394 | Winther | Feb. 27, 1951 |
| 2,605,876 | Becker | Aug. 5, 1952 |
| 2,705,064 | Lear et al. | Mar. 29, 1955 |
| 2,745,527 | Winther | May 15, 1956 |
| 2,750,021 | Trickey | June 26, 1956 |

FOREIGN PATENTS

| | | |
|---|---|---|
| 1,073,987 | France | Mar. 31, 1954 |

OTHER REFERENCES

Technical Report 1213, National Bureau of Standards, Washington, D. C. (Copy received in U. S. Patent Office, March 30, 1948.)